US012724281B2

(12) United States Patent
Zakharov et al.

(10) Patent No.: US 12,724,281 B2
(45) Date of Patent: Sep. 1, 2026

(54) METALENSLET LASER BEAM HOMOGENIZER

(71) Applicants: ZS Systems LLC, Lafayette, IN (US); Purdue Research Foundation, West Lafayette, IN (US)

(72) Inventors: Sergey Zakharov, Lafayette, IN (US); Alexander Kildishev, West Lafayette, IN (US); Omer Yesilyurt, West Lafayette, IN (US)

(73) Assignees: ZS Systems LLC, Lafayette, IN (US); Purdue Research Foundation, West Lafayette, IN (US)

( * ) Notice: Subject to any disclaimer, the term of this patent is extended or adjusted under 35 U.S.C. 154(b) by 317 days.

(21) Appl. No.: 18/403,344

(22) Filed: Jan. 3, 2024

(65) Prior Publication Data

US 2025/0216688 A1 Jul. 3, 2025

(51) Int. Cl.
*G02B 27/09* (2006.01)
*G02B 1/00* (2006.01)

(52) U.S. Cl.
CPC ......... *G02B 27/0916* (2013.01); *G02B 1/002* (2013.01); *G02B 27/0938* (2013.01)

(58) Field of Classification Search
CPC ................ G02B 27/0916; G02B 1/002; G02B 27/0938; G02B 27/0927; G02B 27/48
See application file for complete search history.

(56) References Cited

U.S. PATENT DOCUMENTS

2021/0405255 A1* 12/2021 Kress .................... G02B 1/002
2022/0196480 A1* 6/2022 Ang ........................ G01J 5/045
2023/0280499 A1* 9/2023 Hao .................... G02B 5/1809
359/642

(Continued)

OTHER PUBLICATIONS

Arbabi, Amir, et al. "Subwavelength-thick lenses with high numerical apertures and large efficiency based on high-contrast transmitarrays." Nature communications 6.1 (2015): 7069.

(Continued)

*Primary Examiner* — Tuyen Tra
(74) *Attorney, Agent, or Firm* — Maginot, Moore & Beck LLP

(57) ABSTRACT

A metalenslet beam homogenizer offers an alternative to classical beam homogenization techniques by leveraging flat optical metasurfaces. The metalenslet beam homogenizer would be beneficial, for example, for high power laser applications, such as laser material processing, digital projection, optical lithography, and additive manufacturing in which it is necessary to expose a certain area on a workpiece to a well-defined amount of optical radiation. The metalenslet beam homogenizer provides benefits by enhancing the beam homogenization quality, reducing size and complexity, and lowering optical power loss. It does so by using nanophotonic metasurface lenses and offers higher homogenization quality by mitigating the impact of diffraction and reducing the size of the optical system by combining the functionality of multiple optical elements into fewer devices. Overall, the metalenslet beam homogenizer represents a significant improvement over conventional beam (Continued)

homogenizers, offering a more efficient, more compact, and more reliable way to produce high-quality beam uniformity.

20 Claims, 16 Drawing Sheets

(56) References Cited

U.S. PATENT DOCUMENTS

| | | | | |
|---|---|---|---|---|
| 2024/0077655 | A1* | 3/2024 | Qiu | G02B 17/086 |
| 2024/0241380 | A1* | 7/2024 | Hassan Firoozi | G02B 1/002 |
| 2024/0264278 | A1* | 8/2024 | Hao | G01S 7/4814 |
| 2025/0085549 | A1* | 3/2025 | Shastri | G02B 27/0172 |

OTHER PUBLICATIONS

West, Paul R., et al. “All-dielectric subwavelength metasurface focusing lens.” Optics express 22.21 (2014): 26212-26221.

Engelberg, Jacob, and Uriel Levy. “The advantages of metalenses over diffractive lenses.” Nature communications 11.1 (2020): 1991.

Stewart, James L., et al. “Holographic optics for increased detection efficiency.” Advanced Optics for Imaging Applications: UV through LWIR VI. vol. 11737. SPIE, 2021.

* cited by examiner

300A

300B

300C

300D

300E

Farfield at the Focal Plane (-xy)

Original Beam

Homogenized Beam

METALENSLET LASER BEAM HOMOGENIZER

GOVERNMENT LICENSE RIGHTS

This invention was made with government support under grant number 2127879 awarded by the National Science Foundation. The government has certain rights in the invention.

FIELD

The device disclosed in this document relates to beam homogenization and, more particularly, to a metalenslet laser beam homogenizer.

BACKGROUND

Unless otherwise indicated herein, the materials described in this section are not admitted to be the prior art by inclusion in this section.

Beam homogenizers are optical devices that modify an intensity profile of a light beam, e.g., a laser beam, to provide a uniform intensity over a defined area, while providing minimal intensity outside of the defined area. The defined area may, for example, be a square or rectangular-shaped area or some other shape that is desirable for a particular application.

FIG. 10 illustrates an exemplary beam homogenization. Particularly, in the top portion of the figure, an original beam 2 is illustrated, alongside an intensity plot 4 showing an intensity of the original beam 2 as a function of position along the x and y axes. As can be seen, the original beam 2 has a generally rounded shape that has a greater intensity at its center, which gradually decreases away from the center (e.g., a Gaussian profile). In contrast, in the bottom portion of the figure, a homogenized beam 6 is illustrated, alongside an intensity plot 8 showing an intensity of the homogenized beam 6 as a function of position along the x and y axes. As can be seen, the homogenized beam 6 has a square shape, with a uniform intensity within the square shape and negligible intensity outside of the square shape (e.g., a flat top profile).

Various types of beam homogenizers exist, such as refractive and diffractive, but they often require costly multi-level elements or strict dependence on entrance profile and alignment. One modern example is the microlens beam homogenizer, which utilizes microlenslet arrays in combination with bulky refractive optical elements such as Fourier lenses and telescope systems.

FIG. 11 shows an exemplary microlens beam homogenizer 10. The microlens beam homogenizer 10 includes a first microlenslet array 20 (LA1), which is arranged to receive a laser beam from a fiber optic collimator (not shown) and is configured to split the incoming laser beam into a plurality of beamlets. The microlens beam homogenizer 10 includes a second microlenslet array 30 (LA2), which is arranged to receive the beamlets from the first microlenslet array 20. The second microlenslet array 30 is physically similar to the first microlenslet array 20, except that it is flipped. In this way, the second microlenslet array 30 is configured to refocus or collimate the beamlets. The microlens beam homogenizer 10 includes telescoping lenses 40 (CL1, CL2, CL3, CL4), which are arranged to receive the beamlets from the second microlenslet array 30 and are configured to magnify the beamlets. Finally, the microlens beam homogenizer 10 includes a Fourier lens 50, which is arranged to receive the beamlets from the telescope 40 and is configured to cause the beamlets to converge and superimpose upon one another. An intermediate homogenization plane 60 has a first aperture (AP1) and is situated between the Fourier lens 50 and two relay lenses 70 (RL1, RL2). The Fourier plane is situated between the two relay lenses 70 and has a second aperture 80 (AP2). Finally, the homogenized beam is provided at a final homogenization plane 90.

As can be seen, the microlens beam homogenizer 10 utilizes a combination of several different bulky refractive optical elements to achieve homogenization of the laser beam. Moreover, these optical elements are challenging to align and exhibit low efficiency due to optical losses. Accordingly, it would be beneficial to provide a solution for beam homogenization that requires fewer optical elements to reduce alignment issues and optical losses.

SUMMARY

A light beam homogenizer is disclosed. The light beam homogenizer comprises at least one optical element arranged to receive a light beam from a light source and output a homogenized light beam. The at least one optical element includes at least one metalenslet array. The at least one metalenslet array includes a plurality of metalenslets arranged in an array formation.

A light beam homogenizer is disclosed. The light beam homogenizer comprises a first lenslet array arranged to receive a light beam from a light source and configured to split the light beam into a plurality of beamlets. The light beam homogenizer further comprises a second lenslet array arranged to receive the plurality of beamlets from the first lenslet array and configured to output a homogenized light beam by causing the plurality of beamlets to converge and superimpose upon one another at a homogenization plane. At least one of the first lenslet array and the second lenslet array is a metalenslet array and includes a plurality of metalenslets arranged in an array formation.

A laser system is disclosed. The laser system comprises a laser configured to generate a laser beam. The laser system further comprises a first metalenslet array arranged to receive a light beam from the laser and configured to split the laser beam into a plurality of beamlets. The first metalenslet array includes a first plurality of metalenslets arranged in a first array formation. The laser system further comprises a second metalenslet array arranged to receive the plurality of beamlets from the first metalenslet array and configured to output a homogenized laser beam by causing the plurality of beamlets to converge and superimpose upon one another at a homogenization plane. The second metalenslet array includes a second plurality of metalenslets arranged in a second array formation.

BRIEF DESCRIPTION OF THE DRAWINGS

The foregoing aspects and other features of a light beam homogenizer are explained in the following description, taken in connection with the accompanying drawings.

DETAILED DESCRIPTION

Figure 1A:
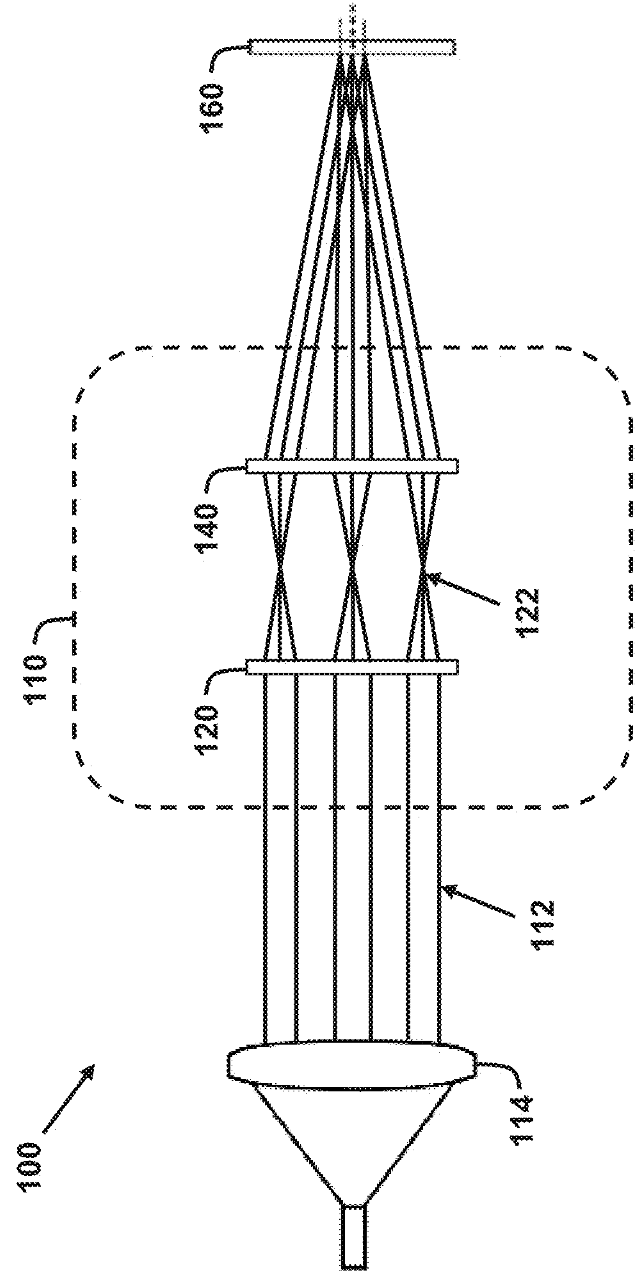
FIG. 1A shows a metalenslet beam homogenizer.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Metalenslet Beam Homogenizer

FIG. 1A shows a metalenslet beam homogenizer 100 according to the disclosure. The metalenslet beam homogenizer 100 is an optical system having an arrangement of optical elements 110 that includes at least one metalenslet array. The optical elements 110 are arranged to receive a laser beam 112 from a fiber optic collimator 114 and are configured to homogenize the laser beam 112 and output a homogenized laser beam at a homogenization plane 160. Although the metalenslet beam homogenizer 100 is described herein with respect to a laser beam provided by a laser, it should be appreciated that the metalenslet beam homogenizer 100 might be used to homogenize any monochromatic light beam from any monochromatic light source. In the illustrated embodiment, the optical elements 110 include a first metalenslet array 120 and a second metalenslet array 140. However, in alternative embodiments, the optical elements 110 may include a traditional microlens array (not shown) in place of the first metalenslet array 120, and only include one metalenslet array (i.e., the second metalenslet array 140).

The metalenslet array(s) are planar optical elements. These planar optical elements are designed as thin nanophotonic metasurfaces that operate using subwavelength features and dramatically reduce the size and complexity of the optical system required for beam homogenization. Compared to the exemplary microlens beam homogenizer 10 discussed above, the first metalenslet array 120 and the second metalenslet array 140 can advantageously and effectively replace several components including the first microlenslet array 20, the second microlenslet array 30, telescoping lenses 40, and the Fourier lens 50. Thus, the metalenslet beam homogenizer 100 provides an optical system with fewer parts, resulting in a reduction in power losses and potential alignment challenges.

Additionally, metalenslet arrays are able to provide a homogenized beam of any shape easily. Particularly, the shape of a homogenized plane mimics the shape of the lenslet. Metalenslets can be easily made into squares, rectangles, hexagons, etc. In the rectangular example, a 16:9 aspect ratio may be of particular interest, as it matches the aspect ratio of commonly used devices (digital projection, digital lithography, additive manufacturing, etc.). In contrast, traditional homogenizers require additional optical elements to reshape the beam from square to rectangular.

In the illustrated embodiment, the first metalenslet array 120 is arranged to receive the laser beam 112 from the fiber optic collimator 114 and is configured to split the incoming laser beam 112 into a plurality of beamlets 122. In this way, compared to the exemplary microlens beam homogenizer 10 discussed above, the first metalenslet array 120 functionally replaces the first microlenslet array 20. However, as noted above, in some alternative embodiments, a traditional microlenslet array may be utilized as the first lenslet array. In some embodiments, the first metalenslet array 120 is configured to generate each respective beamlet by focusing a portion of the incoming laser beam 112 at a focal plane situated between the first metalenslet array 120 and the second metalenslet array 140. In some embodiments, the first metalenslet array 120 is configured to shape each beamlet in the plurality of beamlets 122 to have a predefined shape (e.g., a rectangular or square shape).

In the illustrated embodiment, the second metalenslet array 140 is arranged to receive the plurality of beamlets 122 from the first metalenslet array 120. The second metalenslet array 140 is configured to cause the plurality of beamlets 122 to converge and superimpose upon one another at the homogenization plane 160. Compared to the exemplary microlens beam homogenizer 10 discussed above, the combination of the first metalenslet array 120 and the second metalenslet array 140 functionally replaces the first microlenslet array 20, the second microlenslet array 30, and the telescoping lenses 40, resulting in a relative reduction of optical elements in the metalenslet beam homogenizer 10. In some embodiments, the second metalenslet array 140 is configured to perform the function of a Fourier lens, thus also functionally replacing the Fourier lens 50 compared to exemplary microlens beam homogenizer 10. However, in some embodiments, the optical elements 110 may further include a separate external Fourier lens (not shown). In some embodiments, the second metalenslet array 140 is configured to superimpose the plurality of beamlets 122 upon one another within an area on the homogenization plane 160 having a predefined shape and a predefined size. To this end, in some embodiments, the second metalenslet array 140 is configured to refocus, redirect, and magnify the plurality of beamlets 122 as needed to provide a sharp and correctly sized and shaped homogenized beam at the homogenization plane 160.

The first metalenslet array 120 and the second metalenslet array 140 are arranged at a predetermined distance from one another. To this end, the metalenslet beam homogenizer 100 may include mounting and alignment structures (not shown) configured to support the first metalenslet array 120 and the second metalenslet array 140 and enable easy alignment and calibration.

Figure 1B:
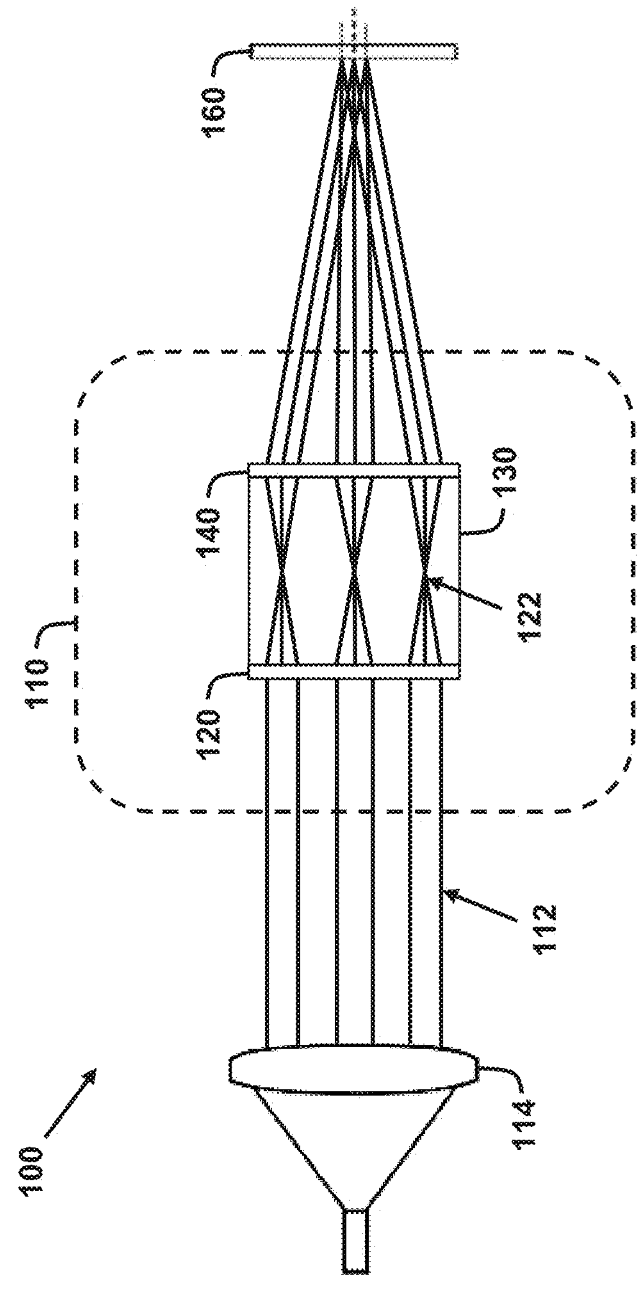
FIG. 1B shows an alternative embodiment of the metalenslet beam homogenizer.

FIG. 1B shows an alternative embodiment in which the first metalenslet array 120 and the second metalenslet array 140 are fabricated as a single structure. Particularly, the optical elements 110 further include an optically transparent substrate 130 situated between the first metalenslet array 120 and the second metalenslet array 140. The substrate 130 may comprise a wide variety of optically transparent dielectric materials that can be nanopatterned with etching, UV, or electron-beam lithography, such as fused silica, titania, alumina (sapphire), and the like. The substrate 130 has a predetermined thickness in a first dimension between a first surface and a second surface that is opposite the first surface. The first metalenslet array 120 is directly etched or deposited onto the first surface of substrate 130 (e.g., one end of the fused silica block). Likewise, the second metalenslet array 140 is directly etched or deposited onto the second surface of substrate 130 (e.g., one end of the fused silica block), opposite the first metalenslet array 120.

Alternatively, the first metalenslet array 120 and the second metalenslet array 140 can be fabricated separately, and, subsequently, the first metalenslet array 120 is glued or otherwise attached to the first surface of the substrate 130 and the second metalenslet array 140 is glued or otherwise attached to the second surface of the substrate 130. In any case, alignment of the first metalenslet array 120 and the second metalenslet array 140 is, thus, performed during fabrication, rather than at the time of assembly, thereby further reducing alignment issues for the end-user. In a similar way, in some alternative embodiments, a metalenslet array can be combined with a traditional lenslet array.

Finally, it should be noted that the metalenslet beam homogenizer 100 that is illustrated and described in detail herein has a so-called "imaging" configuration comprising two lenslet arrays to provide greater flexibility. For example, the size of the homogenization plane can be adjusted by changing the distance between the first metalenslet array 120 and the second metalenslet array 140. However, in some embodiments, the metalenslet beam homogenizer 100 may alternatively adopt a so-called "non-imaging" configuration wherein only a single metalenslet array is used that combines the features and functionality of both the first metalenslet array 120 and the second metalenslet array 140. Accordingly, although the "imaging" configuration is described in detail herein, it should be understood that any described features attributed to the first metalenslet array 120 and the second metalenslet array 140 can be, at least in some embodiments, combined into a single metalenslet array.

It should be appreciated by those of skill in the art that the metalenslet beam homogenizer 100 offers an alternative to classical beam homogenization techniques by leveraging flat optical metasurfaces. The metalenslet beam homogenizer 100 would be beneficial, for example, for high-power laser applications, such as laser material processing, digital projection, optical lithography, and additive manufacturing in which it is necessary to expose a certain area on a workpiece to a well-defined amount of optical radiation. The metalenslet beam homogenizer 100 provides benefits by enhancing the beam homogenization quality and reducing size and complexity. It does so by using nanophotonic metasurface lenses and offers higher homogenization quality by mitigating the impact of diffraction and reducing the size of the optical system by combining the functionality of multiple optical elements into fewer devices. Overall, the metalenslet beam homogenizer 100 represents a significant improvement over conventional beam homogenizers, offering a more efficient, more compact, and more reliable way to produce high-quality beam uniformity.

One major advantage of the metalenslet beam homogenizer 100 is that the use of fewer flat optical elements eliminates the need for as many bulky refractive optical elements. This, in turn, reduces the size and complexity of the metalenslet beam homogenizer 100, compared to conventional beam homogenizers, making it cheaper and easier to install and maintain. Additionally, since there are fewer elements in the system, there are fewer opportunities for misalignment or other issues that can cause beam inhomogeneity.

Furthermore, the use of flat optical elements also has the potential to reduce energy losses associated with conventional beam homogenizers. In conventional systems, each additional optical element causes a loss of energy and lower efficiency. The dissipated energy heats up the optics and nearby components, affecting the stability of the system. By reducing the number of elements in the system, this technology minimizes these losses, resulting in a more efficient and stable beam homogenizer.

Metalenslet Arrays

Figure 2:
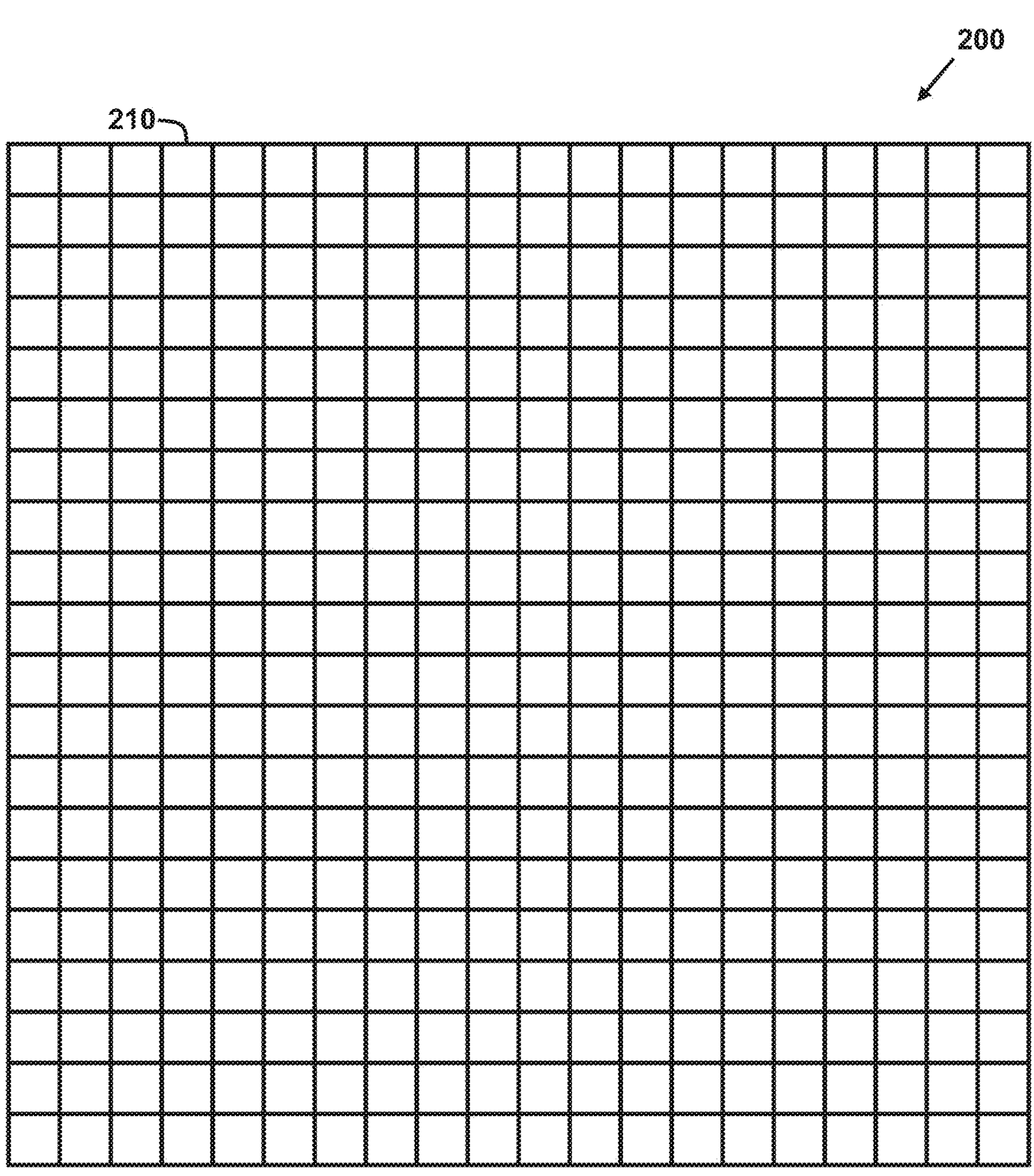
FIG. 2 shows a schematic diagram for a square metalenslet array.

FIG. 2 shows a schematic diagram for a square metalenslet array 200. The metalenslet array 200 is one exemplary embodiment of the first metalenslet array 120 and the second metalenslet array 140. The metalenslet array 200 is a flat nanophotonic metasurface lens comprising a plurality of metalenslets 210 arranged in an array formation. In the illustrated embodiment, the metalenslet array 200 includes 400 metalenslets 210 arranged in a 20×20 square array. However, it should be appreciated that the metalenslet array 200 may include any number of metalenslets 210 arranged in an array of any shape and dimension. For example, the metalenslets 210 are arranged in an array having a rectangular shape, such as a 25×16 rectangular array.

As used herein, the terms "metalenslet" and "metasurface lenslet" refer to a lenslet comprising structures having at least one dimension that is less than a wavelength of the light passing through the lenslet. In some examples, a metalenslet has subwavelength periodic or quasiperiodic structures, such as pillars. Such pillars may, for example, be arranged periodically with a period that is less than the wavelength of the light passing through the lenslet. Such pillars may, for example, have widths that are less than the wavelength of the light passing through the lenslet. However, it should be appreciated that the nano-scale structures of a metalenslet can be tailored in a variety of manners to bend the transmitted light in a desired way or correct for aberrations, etc.

Figure 3:
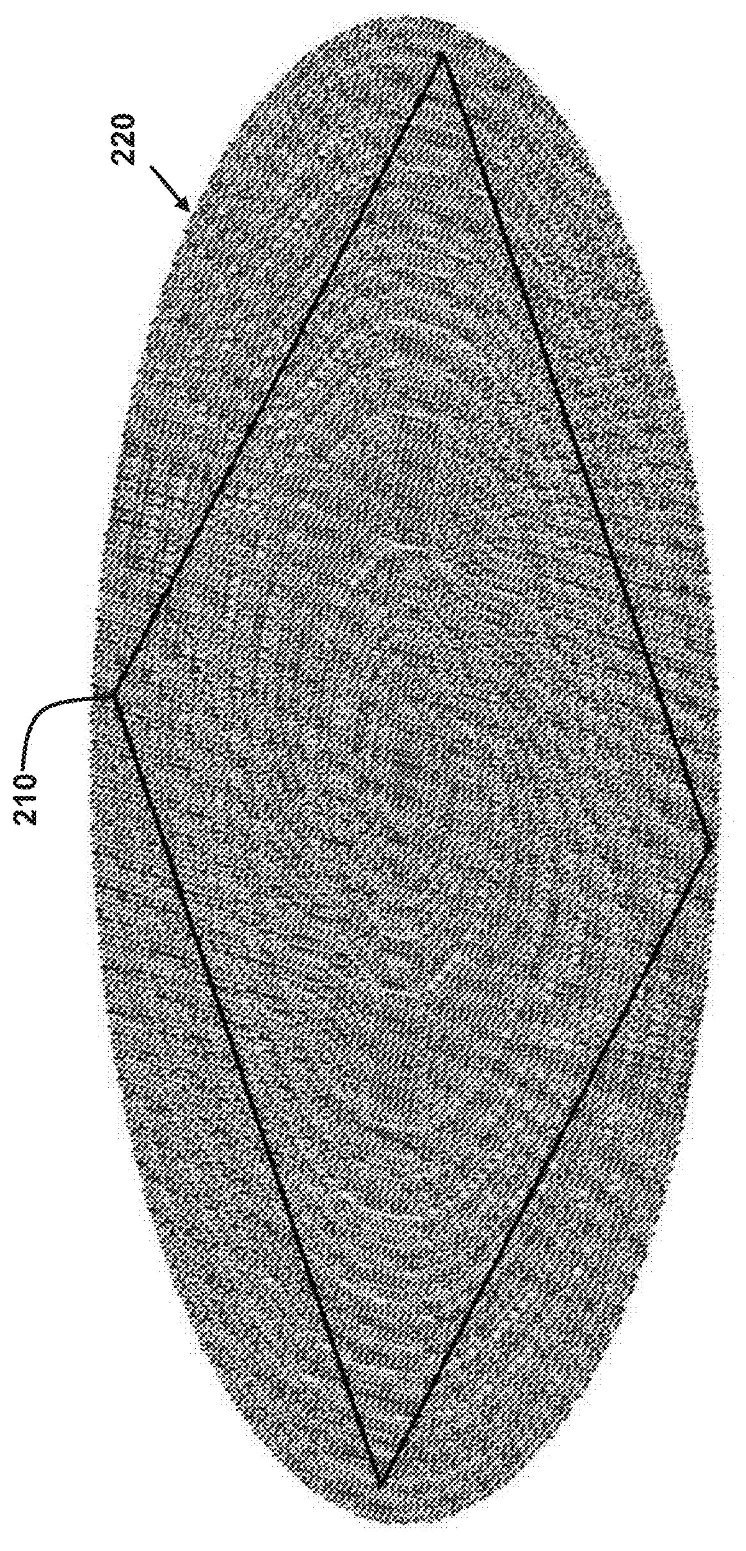
FIG. 3 shows a portion of fused silica block upon which metalenslet arrays may be fabricated.

Each metalenslet 210 of the metalenslet array 200 is fabricated in a planar substrate. In some embodiments, all of the metalenslets 210 of the metalenslet array 200 are fabricated in a common substrate. In at least some embodiments, the planar substrate is fused silica. FIG. 3 shows a portion of fused silica block 220 upon which metalenslet arrays may be fabricated. As can be seen, the metalenslet 210 occupies a rectangular (squared) region on the fused silica block 220.

Each metalenslet 210 comprises a plurality of nanoscale pillars formed in the planar substrate, for example, using electron-beam lithography. In at least some embodiments, the pillars of the metalenslet 210 are arranged in any array formation having a fixed periodicity (i.e., a predetermined fixed distance between the center of each pillar to the next). In at least some embodiments, each pillar of the metalenslet 210 has a same height.

Each metalenslet 210 is configured to modulate the phase of the laser beam passing through the lenslet. This phase modulation is controlled by varying the width of each pillar, thereby manipulating the fill fraction between the voids and the substrate. In at least some embodiments, the voids comprise air gaps. However, in some embodiments, a material, such as silica or silicon nitride, may be deposited to fill the air void between pillars.

Figure 4:
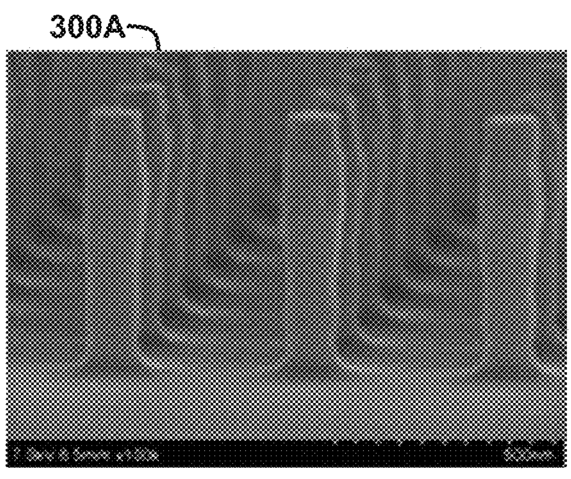
FIG. 4 shows scanning electron microscope (SEM) images of nanoscale pillars having varying widths.
Figure 4:
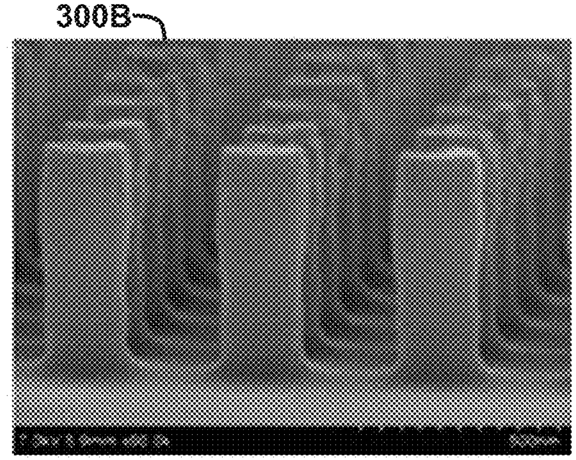
Figure 4:
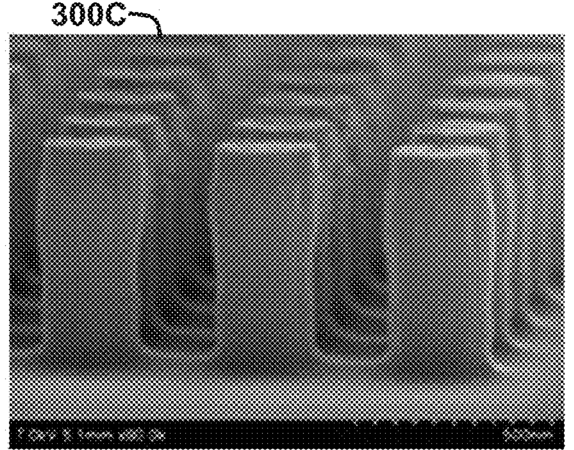
Figure 4:
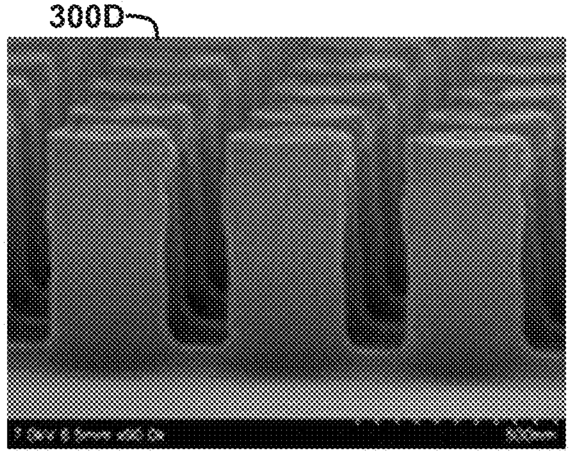
Figure 4:
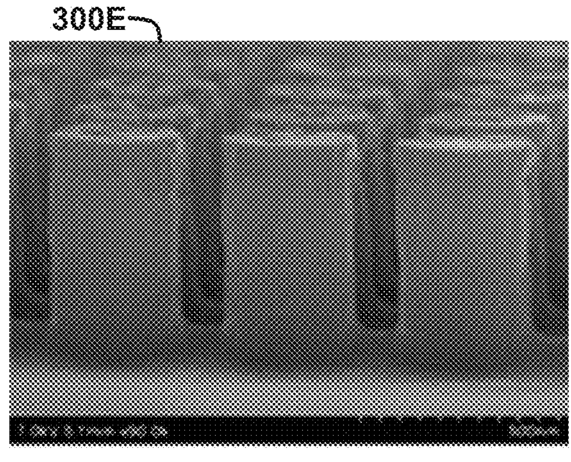

FIG. 4 shows scanning electron microscope (SEM) images of nanoscale pillars having varying widths. Particularly, the image 300A shows nanoscale pillars having a first exemplary width. The image 300B shows nanoscale pillars having a second exemplary width. The image 300C shows nanoscale pillars having a third exemplary width. The image 300D shows nanoscale pillars having a fourth exemplary width. Finally, the image 300E shows nanoscale pillars having a fifth exemplary width.

Figure 5:
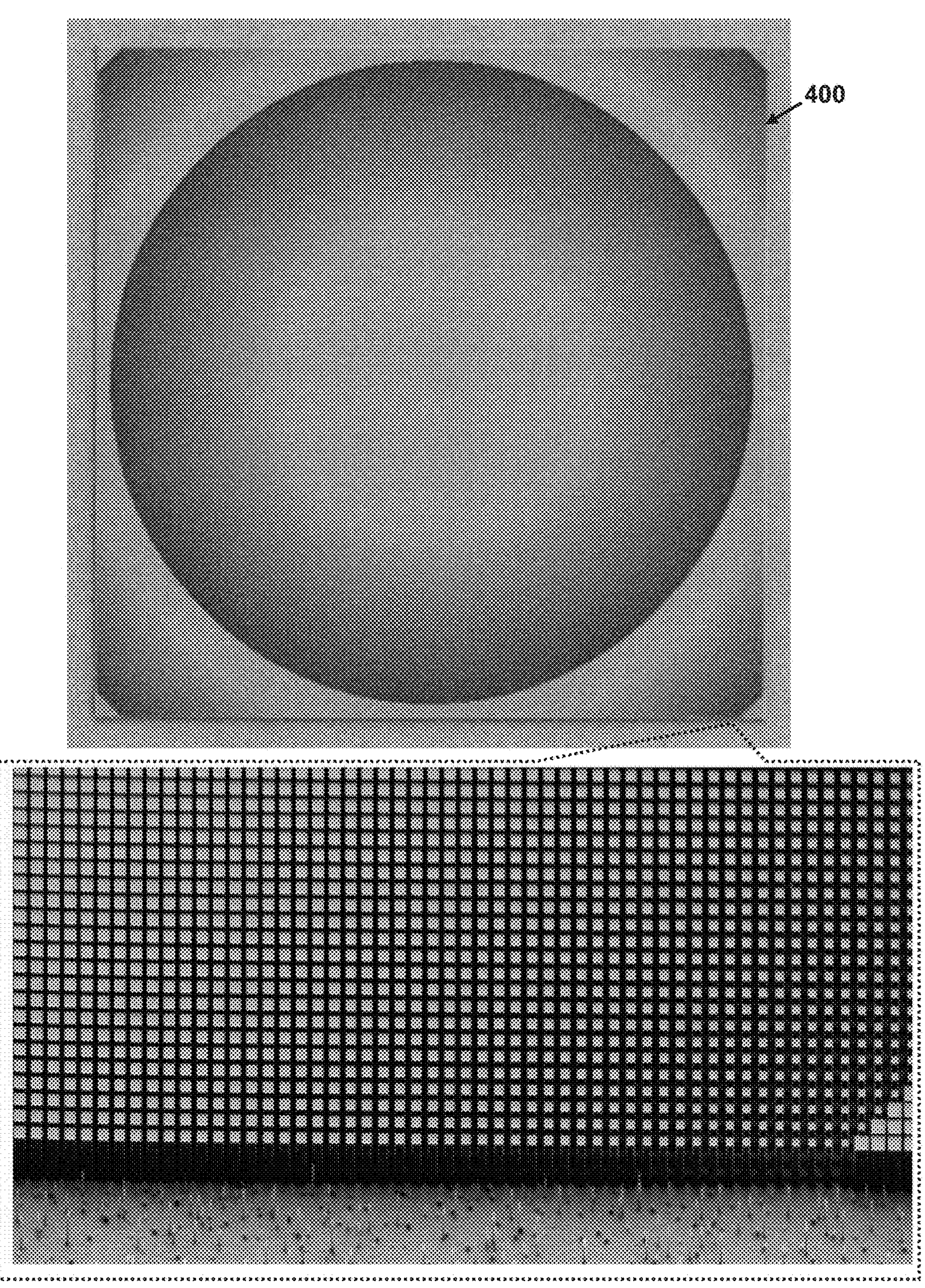
FIG. 5 shows an exemplary metalenslet designed to focus a laser beam.

FIG. 5 shows an exemplary metalenslet 400 designed to focus a laser beam. The top portion of the figure includes an SEM image of metalenslet 400 as whole. The metalenslet 400 has a square shape and, in particular, has the dimensions 480 μm by 480 μm and is designed to focus a laser beam at a 2 cm focal length. The bottom portion of the figure includes a close-up SEM image of the edge of the lenslet, showing the pillar separation as well as the variance in pillar width. Although a square shape is shown, the metalenslets 210 may have a variety of different shapes depending on the intended shape of the homogenized beam. For example, if a 16:9 aspect ratio rectangular homogenized beam is desired, the metalenslets 210 may have 16:9 aspect ratio rectangular shape.

Designing the Metalenslet Arrays of the Metalenslet Beam Homogenizer

It should be appreciated that a metalenslet structured in the manner described above can be designed to perform a wide variety of optical operations on a laser beam passing through the lenslet simply by varying the width of the pillars at different positions across the metalenslet. More particularly, a desired phase change at a particular position on the metalenslet can be achieved with a corresponding pillar width at the particular position on the metalenslet. Consequently, a two-dimensional phase mask or phase distribution describing desired phase changes as a function of position can be translated into a design specifying a pillar width for each pillar of a metalenslet.

In this manner, metalenslet arrays can be designed to provide a variety of optical functions. In some cases, phase masks can be designed to combine multiple optical functions into a single element that would otherwise be impractical or impossible using conventional optical elements, such as polished curved glass lenses.

To enable full phase control for a given wavelength of the laser and a given substrate material, suitable pillar geometries must be determined for full phase range (i.e., 2π radians or 360 degrees). An exemplary design process is described below for identifying suitable pillar geometries for a laser beam having a 1.55 μm wavelength and using silicon for fabricating the pillars of the metasurface, which has a refractive index of 3.47 at 1.55 μm. However, it should be appreciated that the resulting pillar geometries will differ depending on the wavelength of the laser and on the substrate material in which the metasurface is to be fabricated.

In order to determine the correct pillar geometry for full phase rotation, several models were generated with varying pillar thicknesses (widths), allowing for a slow gradient of refractive index. For the initial design, the period (i.e., the distance between each nanoscale pillar) was chosen as 400 nm, as the periodicity must be less than the cutoff scale $\lambda_0$=n where $\lambda_0$ is the incident wavelength in free space, which was 1.55 μm, and where n denotes the substrate material's refractive index, which was 3.47. These metrics have significant importance as the goal was to obtain a phase mask with $0^{th}$ order diffraction to minimize scattering loss into other diffraction orders of the beam. Therefore, the cutoff scale was 453 nm and greater than the chosen period, thus minimizing scattering. Note that the nanoscale pillar periodicity was constant across the entire lens.

The exemplary design process included sweeping the pillar widths from 100 nm to 350 nm in 10 nm increments, resulting 25 unique pillar widths. Next, the 25 unique pillar widths were modeled at various pillar heights, which were in each case constant heights across all 25 pillar widths. Particularly, the 25 unique pillar widths were modeled with heights from 300 nm, incremented by 50 nm increments until a full 360-degree phase change across the 25 pillars was achieved. In the exemplary design process, a full phase gradient was achieved once a pillar height of 900 nm was reached.

Figure 6:
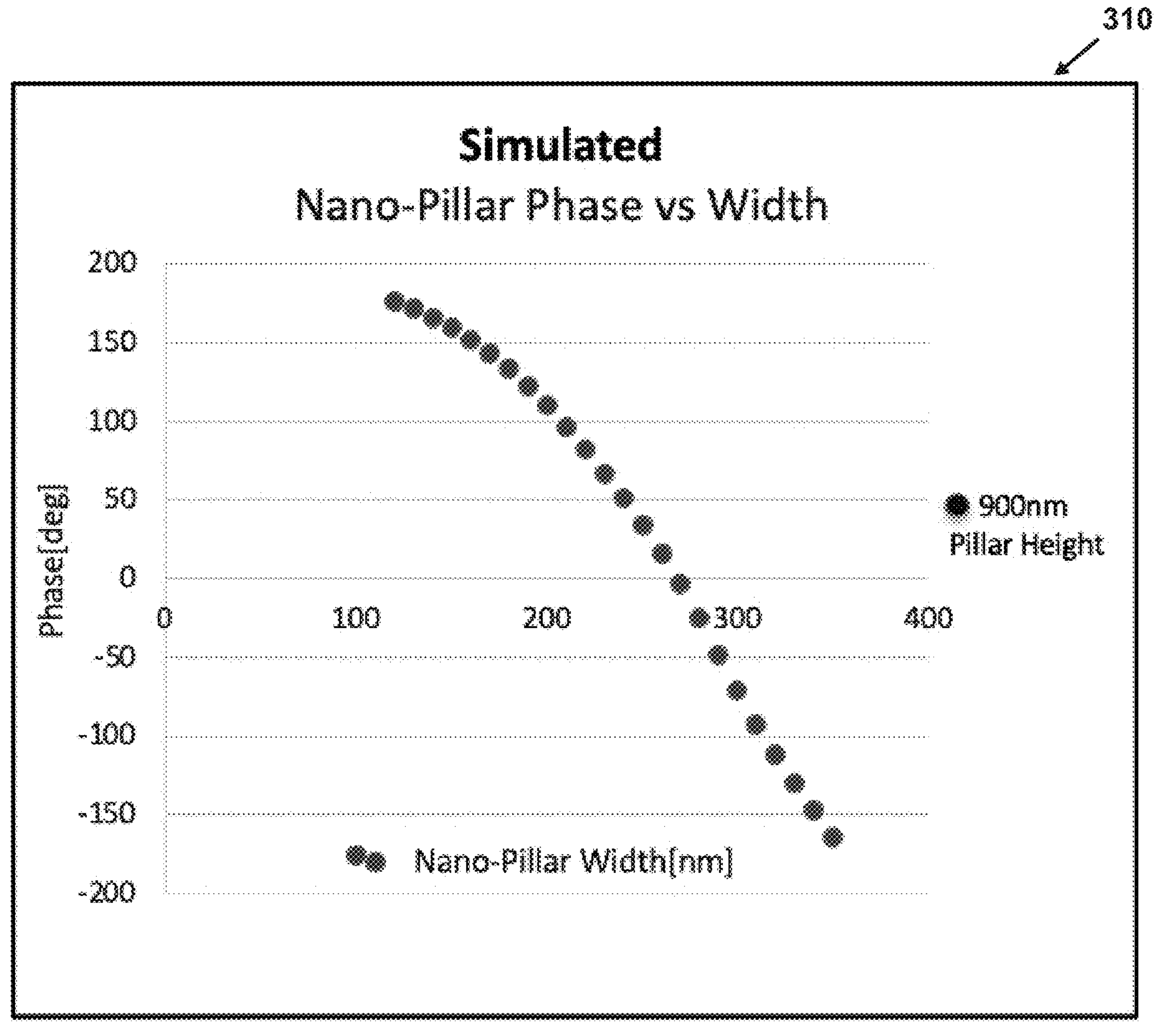
FIG. 6 shows a plot summarizing simulated phase changes of laser beam passing through metalenslets having pillars of a variety of widths.

FIG. 6 shows a plot summarizing simulated phase changes of laser beam passing through metalenslets having pillars of a variety of widths. The simulated pillar widths ranged between 100 nm and 350 nm, with 10 nm increments between each simulated pillar width, resulting in 25 unique pillar widths. As can be observed, this variety of pillar widths is capable of producing full 360-degree phase changes in the laser beam.

In another example of the design process, scalability was shown by producing similar results at 4.5 μm wavelength and subsequently increasing the pillar geometry to compensate for the longer wavelength. For instance, given a 4.5 μm wavelength laser and with the period (i.e., the distance between each nanoscale pillar) set to 1200 nm, full 360-degree phase rotation was achieved with pillar widths ranging from 500 nm to 1150 nm and with the pillar heights set to 2.7 μm.

Once a suitable set of pillar geometries are identified that are suitable for the given wavelength and substrate material, the next step is to assign pillar widths to the pillars of each metalenslet 210 of each metalenslet array 120, 140 in the metalenslet beam homogenizer 100. For each metalenslet 210, a phase mask and/or phase distribution is calculated that achieves the desired operation of the metalenslet array 120, 140.

As discussed above, the first metalenslet array 120 is configured to split the incoming laser beam 112 into the plurality of beamlets 122. Accordingly, phase masks are calculated such that the first metalenslet array 120, as a whole, is configured to split the incoming laser beam 112 into the plurality of beamlets 122. To this end, in at least some embodiments, the phase mask of each metalenslet 210 of the first metalenslet array 120 is calculated such that each metalenslet 210 generates a respective 122 beamlet by focusing a portion of the incoming laser beam 112 at a focal plane situated between the first metalenslet array 120 and the second metalenslet array 140. In at least some embodiments, in the case of the first metalenslet array 120, each metalenslet 210 is configured identically. Thus, the phase mask needs only to be calculated for one of the metalenslets 210 and can be replicated to create the array.

Similarly, as discussed above, the second metalenslet array 140 is configured to cause the plurality of beamlets 122 to converge and superimpose upon one another at the homogenization plane 160. Accordingly, phase masks are calculated such that the second metalenslet array 140, as a whole, is configured to cause the plurality of beamlets 122 to converge and superimpose upon one another at the homogenization plane 160. To this end, in at least some embodiments, the phase mask of each metalenslet 210 of the second metalenslet array 140 is calculated such that the each metalenslet 210 collimates and steers/redirects, a respective one of the beamlets 122 as needed to provide a sharp and correctly sized and located homogenized beam at the homogenization plane 160.

Figure 7A:
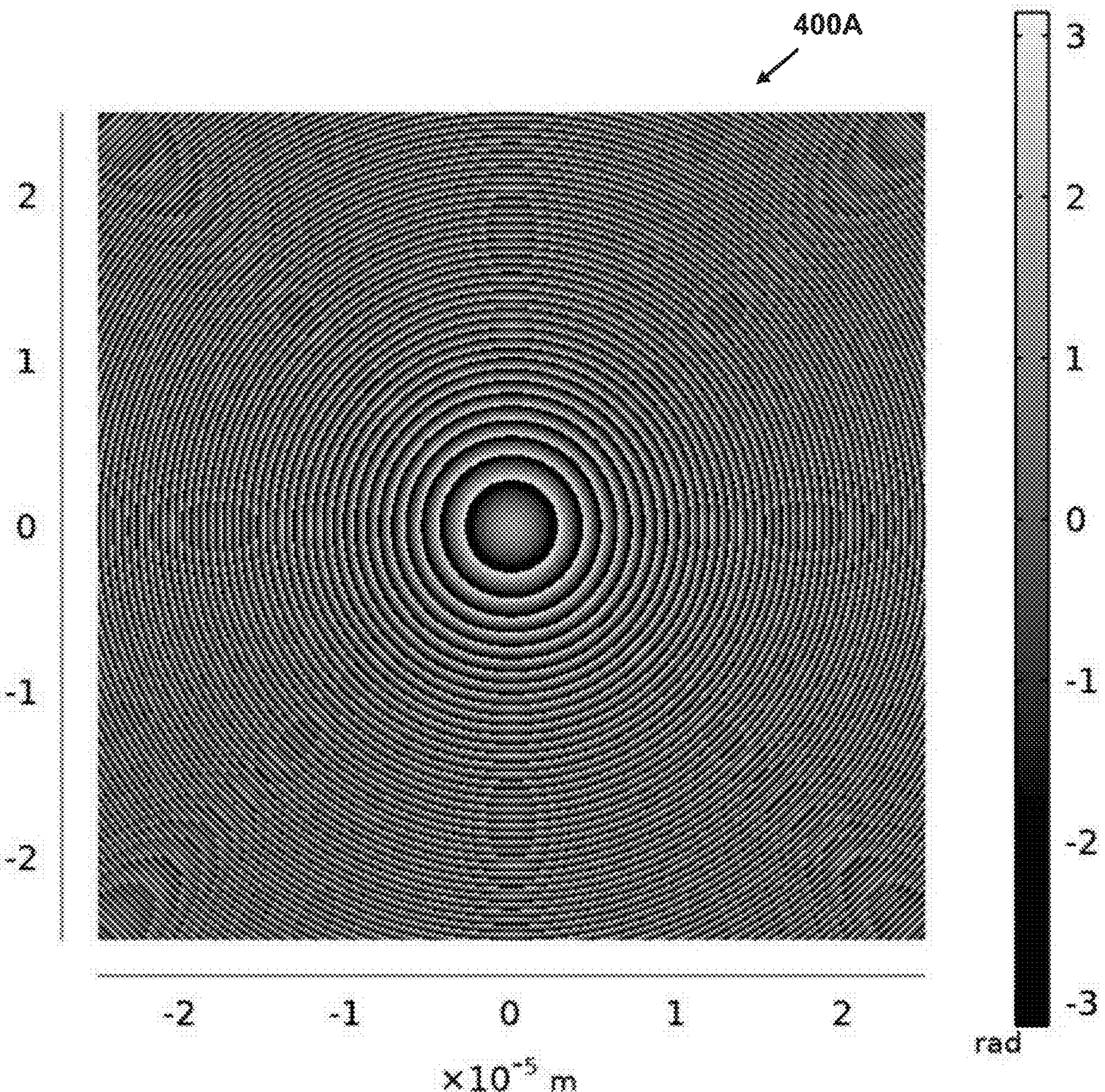
FIG. 7A shows a plot for a phase mask/phase distribution of one exemplary metalenslet.
Figure 7B:
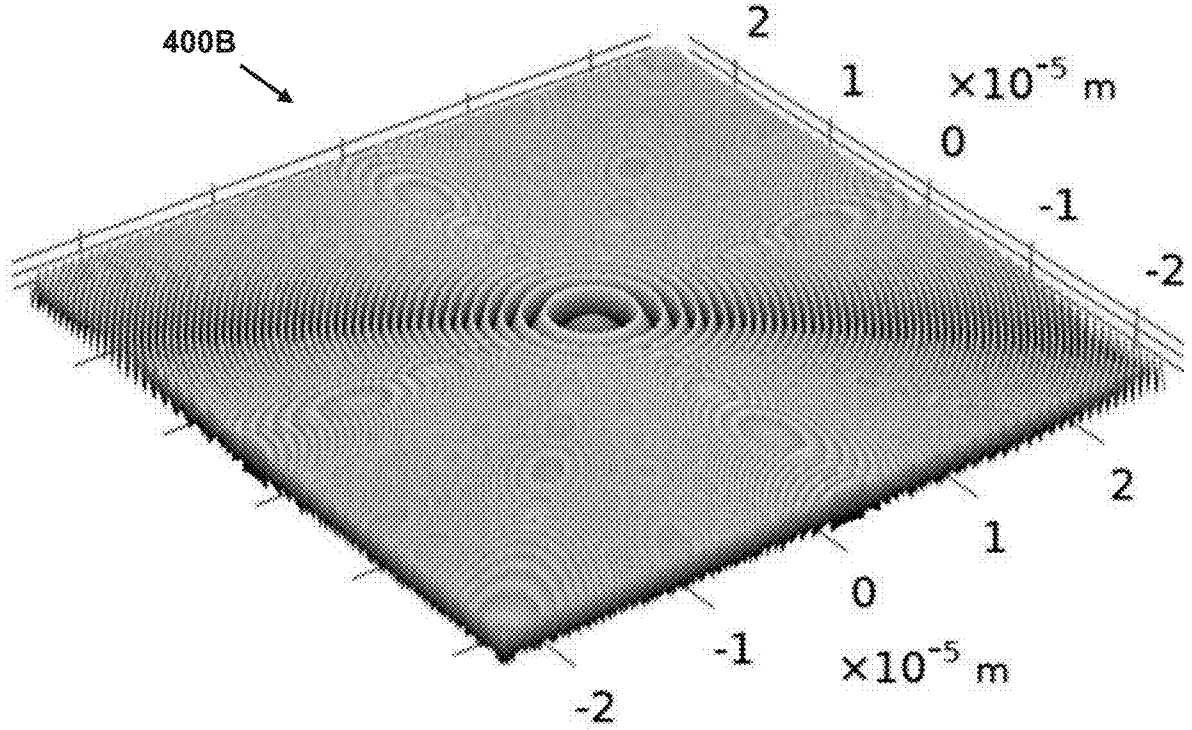
FIG. 7B shows a plot for a corresponding refractive-index distribution of the exemplary metalenslet.

As an example, FIG. 7A shows a plot 400A for a phase mask/phase distribution of one exemplary metalenslet. FIG. 7B shows a plot 400B for a corresponding refractive-index distribution of the exemplary metalenslet. As can be seen, the phase mask defines phase angles as a function of position and calls for phase angles between txt radians. The exemplary metalenslet has dimensions 60 μm by 60 μm in the x-y plane, and includes a 150×150 array of nanoscale pillars spaced with a 400 nm period, for a total of 22,500 pillars. The phase mask can be used to determine a required pillar width of each pillar in the exemplary metalenslet.

With a phase mask calculated for each metalenslet 210 of each metalenslet array 120, 140, the next step is to calculate a desired phase angle for each pillar of each metalenslet 210 of each metalenslet array 120, 140. In each case, the desired phase angle is mapped to a corresponding pillar width. In this manner, the pillar width for every pillar of every metalenslet 210 of each metalenslet array 120, 140 is determined. Finally, with the pillar widths defined, the metalenslet array 120, 140 can be fabricated using known techniques, such as electron-beam lithography. In at least some embodiments, the pillar widths may include pillar widths other than the previously simulated pillar widths (e.g., the 25 unique widths derived in the exemplary design process). Particularly, more precise pillar widths corresponding to each phase angle can be interpolated based on the previously simulated unique pillar widths.

Figure 8A:
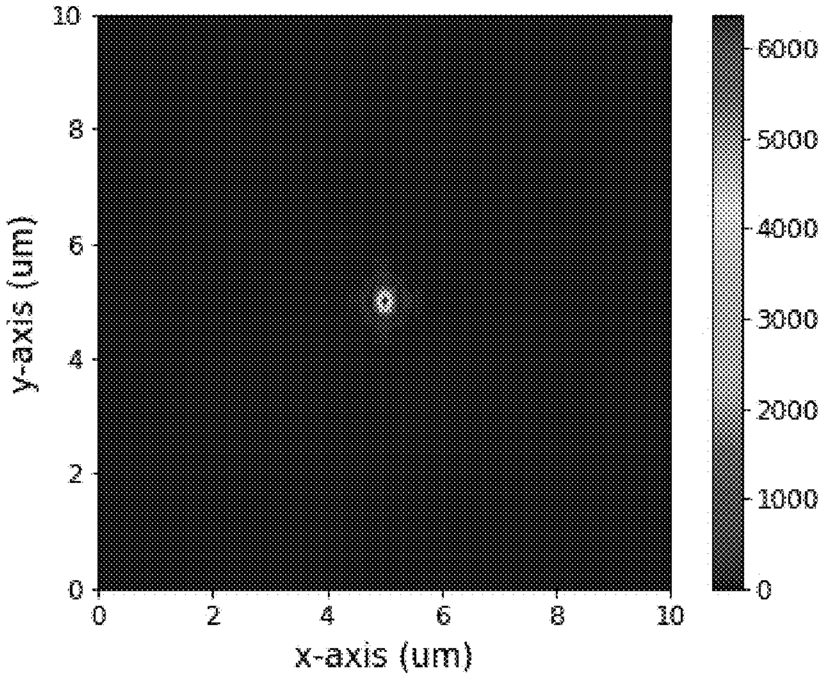
FIGS. 8A-8B show far-field projections at the focal plane, summarizing a performance of a metalenslet in the metalenslet beam homogenizer.
Figure 8A:
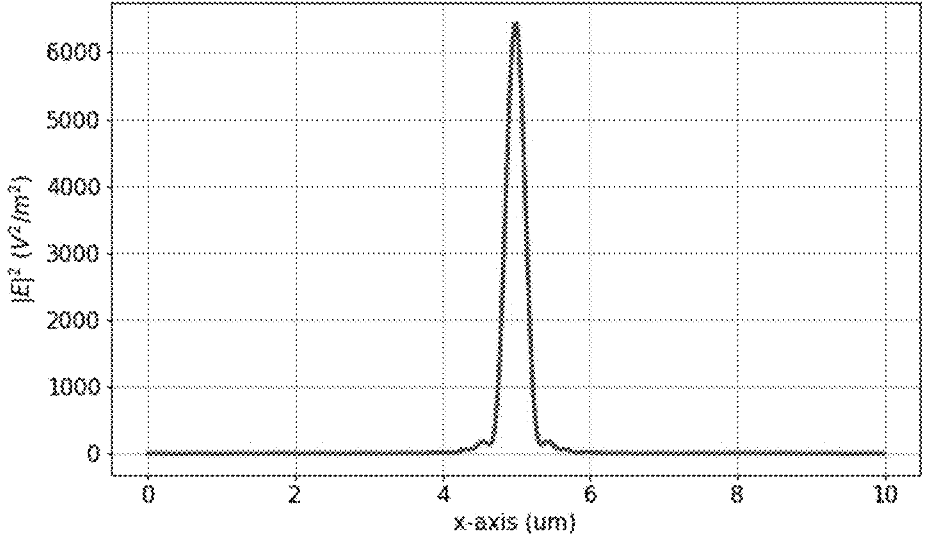
Figure 8B:
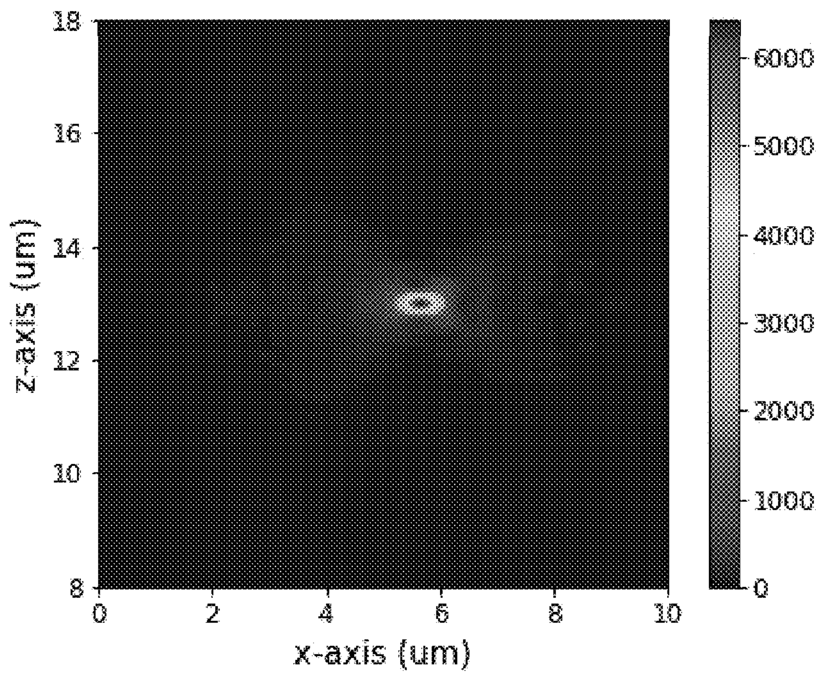
Figure 8B:
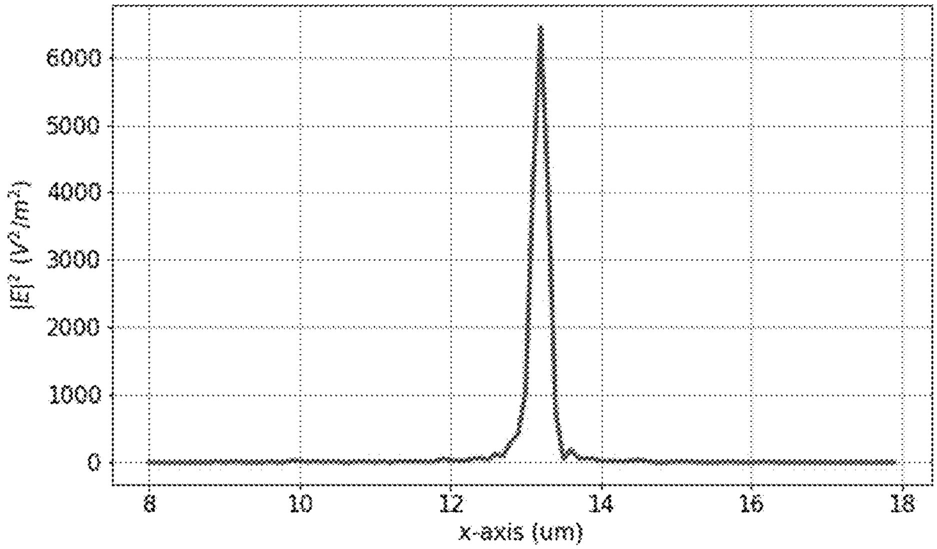

FIGS. 8A and 8B show far-field projections at the focal plane, summarizing the performance of a metalenslet in the metalenslet beam homogenizer 100.

Testing and Simulation

Figure 9A:
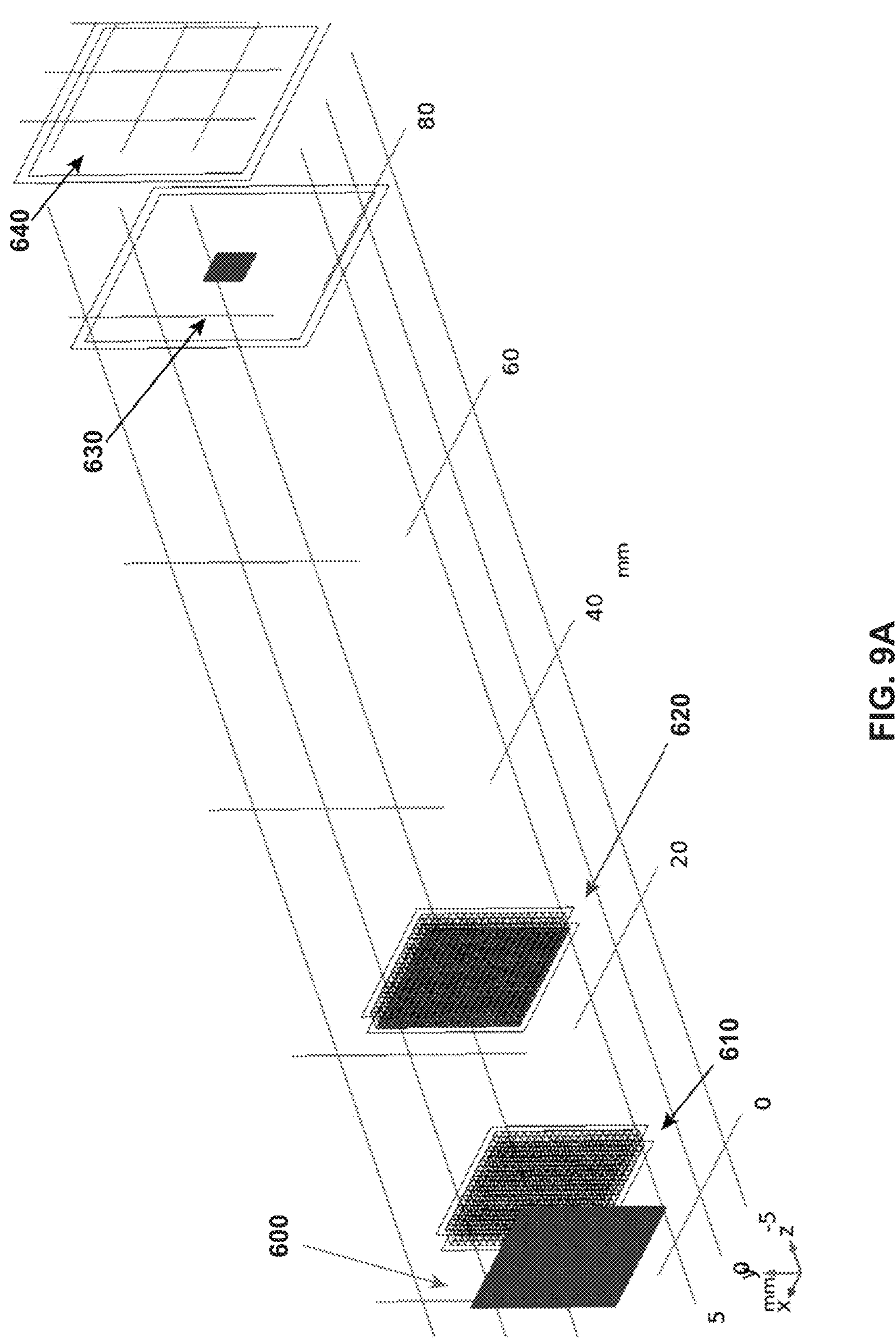
FIG. 9A shows a testing schematic used for numerical simulation of the exemplary embodiment of the metalenslet beam homogenizer.
Figure 9B:
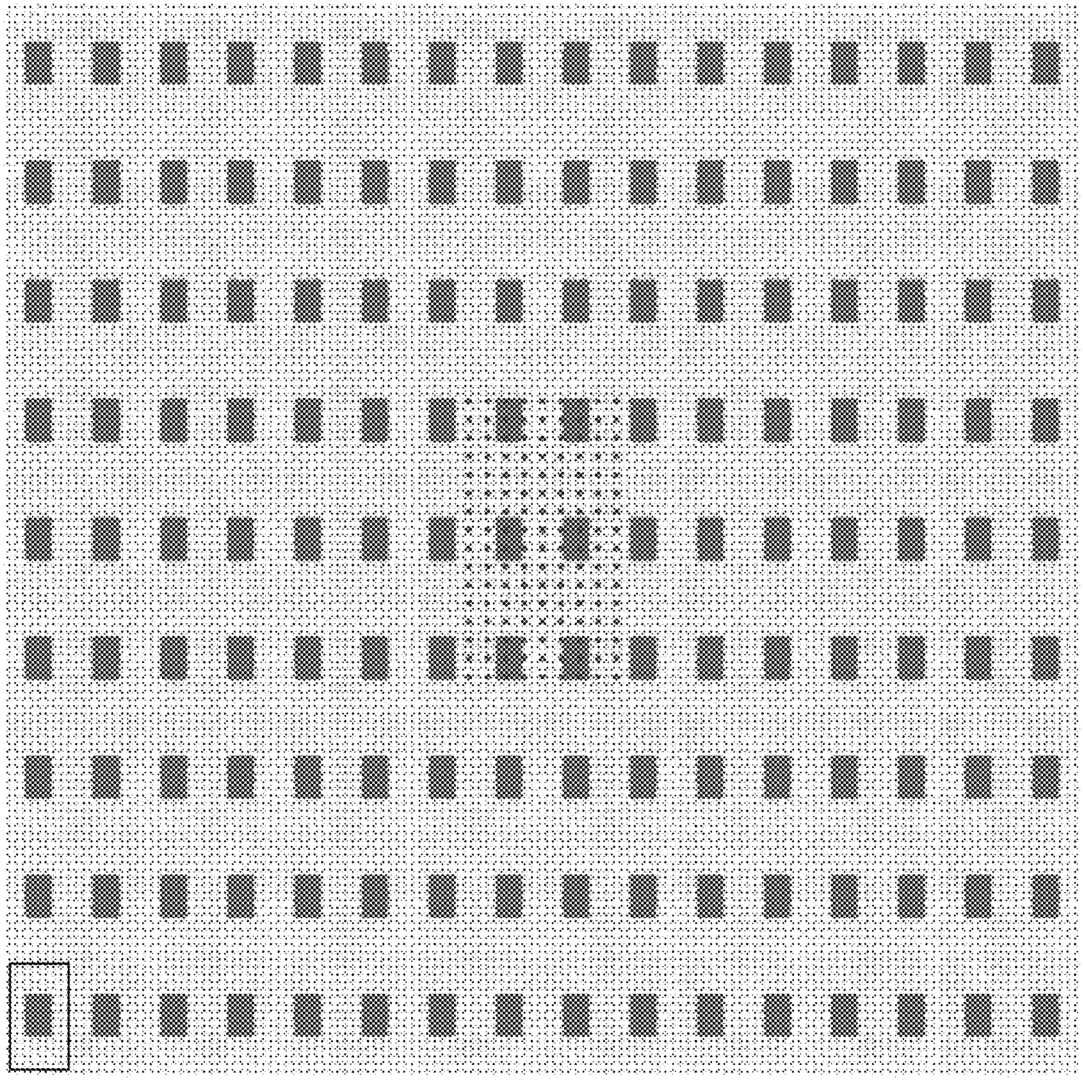
FIGS. 9B-C show simulation results with virtual rays distributed over an illuminating plane
Figure 9C:
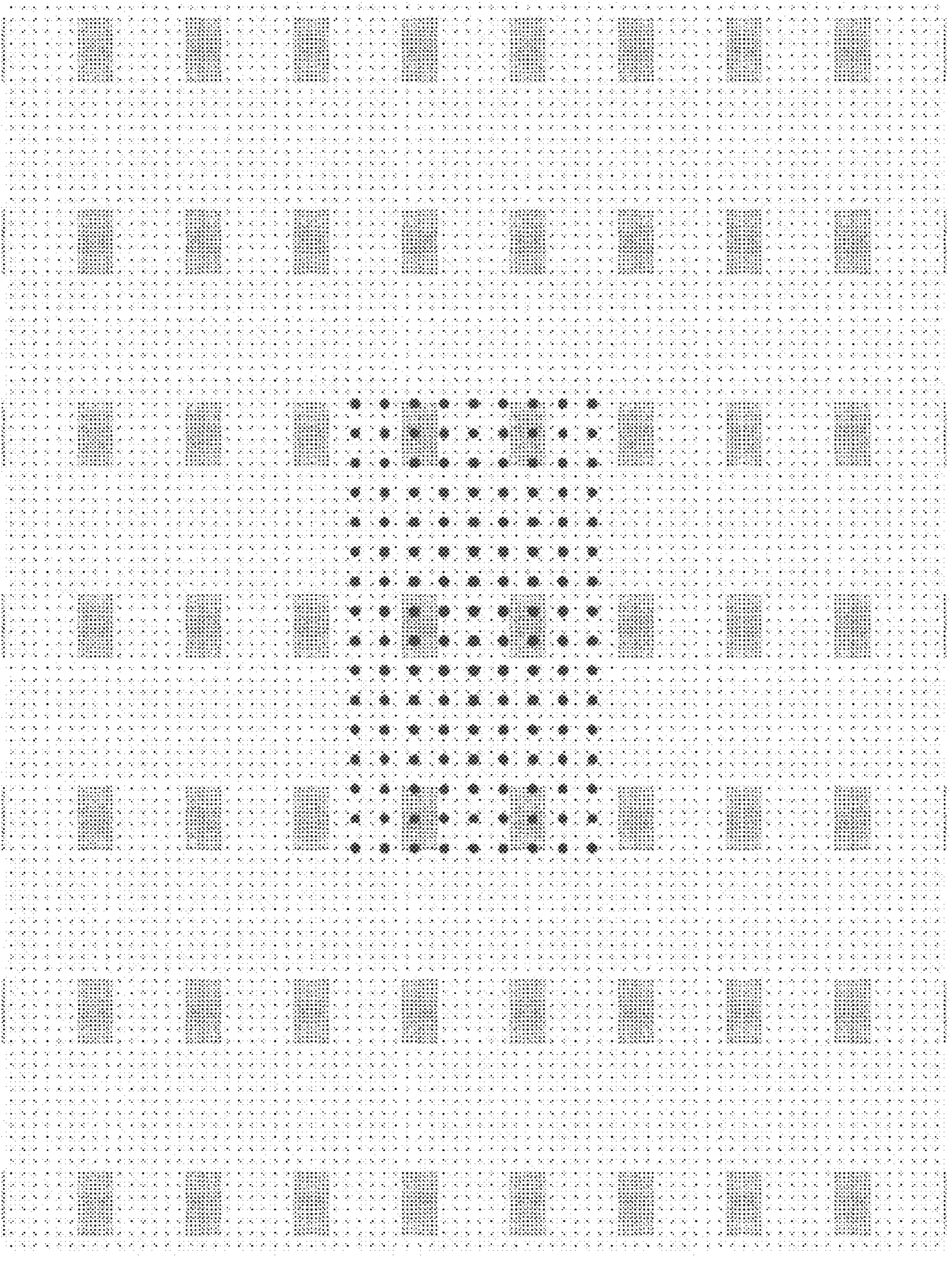
Figure 10:
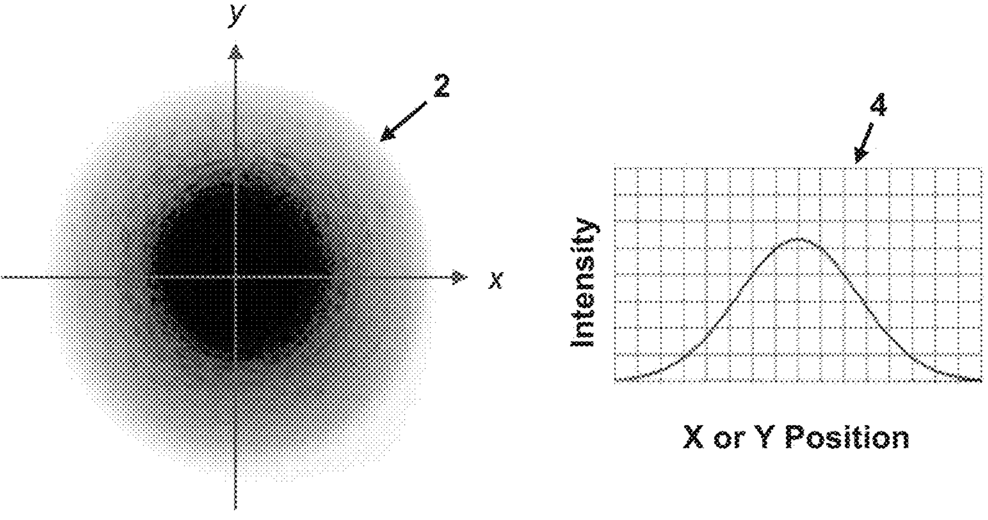
FIG. 10 illustrates an exemplary beam homogenization.
Figure 10:
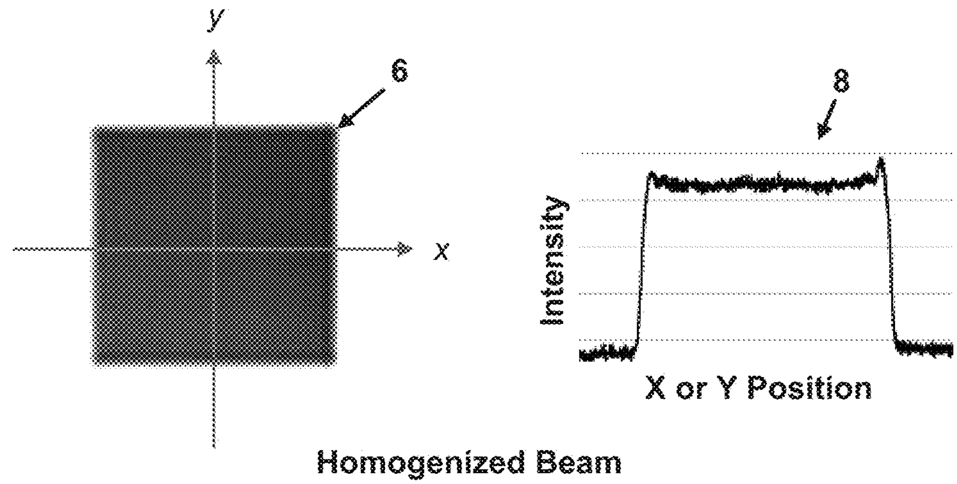
Figure 11:
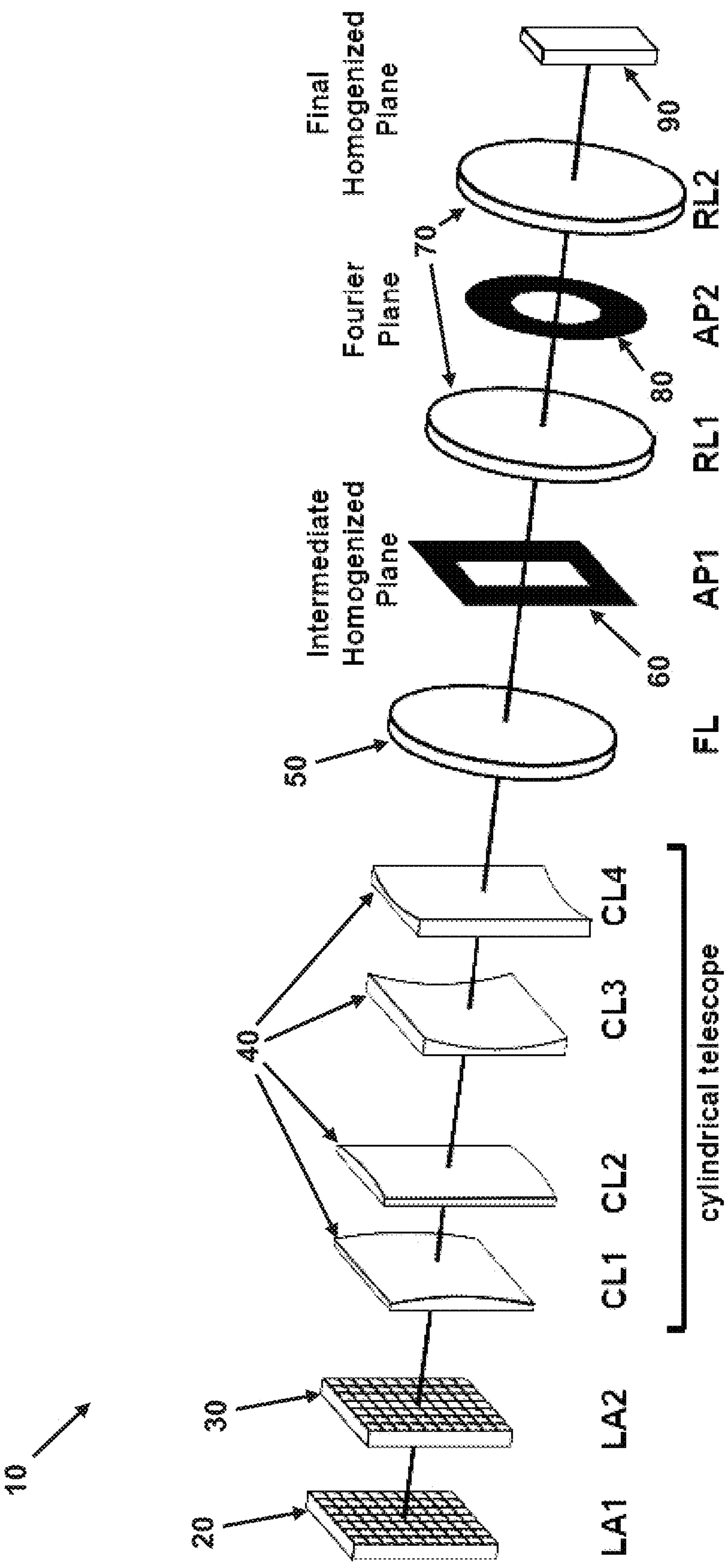
FIG. 11 shows an exemplary microlens beam homogenizer.

FIGS. 9A-9C illustrate a numerical simulation of an exemplary embodiment of the metalenslet beam homogenizer 100 designed for 16:9 rectangular beam homogenization. FIG. 9A depicts a testing schematic used for numerical simulation of the exemplary embodiment of the metalenslet beam homogenizer 100. For the purpose of simulation, a single incident laser beam is represented by a large number of discrete virtual rays. It should be appreciated that the virtual rays are a numerical discretization concept, and the number of rays is not fixed and is not a part of the design of the metalenslet beam homogenizer 100. The large number of virtual rays are emitted out of a plane of incident rays 600 and propagated through a first planar metalenslet array 610 and a second planar metalenslet array 620 (which incorporates the Fourier lens). By way of the metalenslet array 620 integrated with the Fourier lens, all of the virtual rays are focused at a homogenizer image plane 630. A ray stop 640 is situated behind the homogenizer image plane 630 to make the virtual rays vanish beyond this plane.

In the simulated embodiment of the metalenslet beam homogenizer 100, the metalenslet arrays 610, 620 have a square shape (e.g., 10×10 mm). However, each individual metalenslet of the metalenslet arrays 610, 620 has a 16:9 aspect ratio rectangular shape. As a result, the beamlets and the homogenized beam become rectangular having the 16:9 aspect ratio.

FIG. 9B shows simulation results with the virtual rays distributed over an illuminating plane. Each incident virtual ray on the first metalenslet array 610 is illustrated in the figure as a small dot. A solid-line rectangle in the top-left corner depicts the footprint of each metalenslet. Each lenslet collects a subset of the virtual rays, to form a virtual beamlet.

The first metalenslet array 610 focuses all of its virtual rays into smaller rectangles, illustrated as solid rectangles in the figure, distributed over the plane of the second metalenslet array 620. After that, the second metalenslet array 620 combines all the individual rectangles into an overlapped homogenized image at the image plane of the system. The resulting image is shown with an array of larger dots near the center of the figure. Each of the larger dots represent an overlaid combination of virtual rays received from each beamlet, thus dramatically amplifying the focused intensity. FIG. 9C shows a zoomed-in and cropped view of the simulation results. As can be seen, the Fourier lens embedded into the planar design of the second metalenslet array 620 yields the desired result of a homogenized beam having a 16:9 aspect ratio rectangular shape.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A light beam homogenizer comprising:

a first lenslet array arranged to receive a light beam from a light source and configured to split the light beam into a plurality of beamlets; and a second lenslet array arranged to receive the plurality of beamlets from the first lenslet array and configured to output a homogenized light beam by causing the plurality of beamlets to converge and superimpose upon one another at a homogenization plane, the homogenized light beam having a substantially uniform intensity distribution across a predefined area at the homogenization plane, wherein at least one of the first lenslet array and the second lenslet array is a metalenslet array having a plurality of metalenslets arranged in an array formation.

2. The light beam homogenizer of claim 1, the first lenslet array comprising:

a first metalenslet array arranged to receive the light beam from the light source and configured to split the light beam into the plurality of beamlets, the first metalenslet array having a first plurality of metalenslets arranged in a first array formation.

3. The light beam homogenizer of claim 2, wherein the first metalenslet array is configured to shape the plurality of beamlets to have a predefined shape, and each metalenslet in the first plurality of metalenslets has the predefined shape.

4. The light beam homogenizer of claim 3, wherein the predefined shape is a rectangular shape.

5. The light beam homogenizer of claim 2, wherein each metalenslet in the first plurality of metalenslets is configured identically.

6. The light beam homogenizer of claim 1, the second lenslet array comprising:

a second metalenslet array arranged to receive the plurality of beamlets from the first lenslet array and configured to cause the plurality of beamlets to converge and superimpose upon one another at the homogenization plane, the second metalenslet array having a second plurality of metalenslets arranged in a second array formation.

7. The light beam homogenizer of claim 6, wherein the second metalenslet array is configured to cause the plurality of beamlets to converge and superimpose upon one another within an area on the homogenization plane having a predefined shape and a predefined size.

8. The light beam homogenizer of claim 1 further comprising:

an optically transparent substrate having a predetermined thickness in a first dimension between a first surface and a second surface that is opposite the first surface, wherein the first lenslet array is arranged on the first surface of the optically transparent substrate and the second lenslet array is arranged on the second surface of the optically transparent substrate.

9. The light beam homogenizer of claim 8, wherein at least one of the first lenslet array and the second lenslet array is directly etched or deposited onto the optically transparent substrate.

10. The light beam homogenizer of claim 8, wherein at least one of the first lenslet array and the second lenslet array is fabricated separately and subsequently attached to the optically transparent substrate.

11. The light beam homogenizer of claim 1, each respective metalenslet in the plurality of metalenslets comprising:

a plurality of pillars formed on a planar substrate.

12. The light beam homogenizer of claim 11, wherein the planar substrate is fused silica and the plurality of pillars are formed from silicon nitride.

13. The light beam homogenizer of claim 11, wherein the plurality of pillars are arranged in an array formation.

14. The light beam homogenizer of claim 13, wherein the array formation has a fixed period that is less than a wavelength of the light beam.

15. The light beam homogenizer of claim 11, wherein each pillar in the plurality of pillars has a same height.

16. The light beam homogenizer of claim 11, wherein the pillars in the plurality of pillars have variable widths such that the respective metalenslet causes a position-variant phase change in the light beam as the light beam passes through the respective metalenslet.

17. The light beam homogenizer of claim 11, wherein the pillars in the plurality of pillars have widths that are less than a wavelength of the light beam.

18. The light beam homogenizer of claim 1, wherein the light source is a monochromatic light source and the light beam is a monochromatic light beam.

19. A light beam homogenizer comprising:

at least one lenslet array arranged to receive a light beam from a light source and configured to split the light beam into a plurality of beamlets; and a lens arranged to receive the plurality of beamlets from the at least one lenslet array and configured to output a homogenized light beam by causing the plurality of beamlets to converge and superimpose upon one another at a homogenization plane, the homogenized light beam having a substantially uniform intensity distribution across a predefined area at the homogenization plane, wherein at least one of the at least one lenslet array is a metalenslet array and includes a plurality of metalenslets arranged in an array formation.

20. A light beam homogenizer comprising:

a metalenslet array arranged to receive a light beam from a light source and configured to output a homogenized laser beam by splitting the light beam into a plurality of beamlets and causing the plurality of beamlets to converge and superimpose upon one another at a homogenization plane, the homogenized light beam having a substantially uniform intensity distribution across a predefined area at the homogenization plane, wherein the metalenslet array includes a plurality of metalenslets arranged in an array formation.

* * * * *